United States Patent
Brutoco

(10) Patent No.: US 10,308,340 B2
(45) Date of Patent: Jun. 4, 2019

(54) SYSTEM, METHOD AND APPARATUS FOR WIDESPREAD COMMERCIALIZATION OF HYDROGEN AS A CARBON-FREE FUEL SOURCE

(71) Applicant: Rinaldo Brutoco, Ojai, CA (US)

(72) Inventor: Rinaldo Brutoco, Ojai, CA (US)

( * ) Notice: Subject to any disclaimer, the term of this patent is extended or adjusted under 35 U.S.C. 154(b) by 235 days.

(21) Appl. No.: 15/351,759

(22) Filed: Nov. 15, 2016

(65) Prior Publication Data
US 2017/0233055 A1    Aug. 17, 2017

Related U.S. Application Data

(63) Continuation-in-part of application No. 14/324,124, filed on Jul. 4, 2014, now Pat. No. 9,493,223, which
(Continued)

(51) Int. Cl.
*B64B 1/62* (2006.01)
*H02S 20/00* (2014.01)
(Continued)

(52) U.S. Cl.
CPC ............... *B64B 1/62* (2013.01); *B64B 1/06* (2013.01); *B64B 1/12* (2013.01); *B64B 1/20* (2013.01); *B64B 1/28* (2013.01); *B64B 1/32* (2013.01); *B64B 1/64* (2013.01); *B64B 1/66* (2013.01); *C25B 1/04* (2013.01); *H01M 10/465* (2013.01); *H02J 7/355* (2013.01); *H02S 20/30* (2014.12); *B64D 27/24* (2013.01); *B64D 2041/005* (2013.01); *B64D 2211/00* (2013.01); *H01M 2220/20* (2013.01); *Y02E 60/366* (2013.01);
(Continued)

(58) Field of Classification Search
CPC .............. B64B 1/58; B64B 1/62; H02S 10/40
See application file for complete search history.

(56) References Cited

U.S. PATENT DOCUMENTS

| 1,687,204 A | 10/1928 | Hall | ........................ B64B 1/62 244/97 |
| 1,876,153 A | 9/1932 | Spurrier | .................. B64D 1/22 244/104 R |

(Continued)

FOREIGN PATENT DOCUMENTS

WO    WO 2005/019025    3/2005

OTHER PUBLICATIONS

"Freedom from Mid-East Oil" J. Brown, R. Brutoc and J. Cushmano, 2007 Supplied in parent case.
(Continued)

*Primary Examiner* — Joseph W Sanderson
(74) *Attorney, Agent, or Firm* — Clifford H. Kraft

(57) ABSTRACT

A system for transporting hydrogen from where it can be economically made to where it is most needed using airships. Green technologies can be used to generate electricity near to the primary energy sources. This electricity can then be used to produce hydrogen directly from water. Hydrogen can be delivered using an airship in which the hydrogen gas can also be used for generating lift, providing propulsion energy and serving ancillary needs. The ship can be equipped with solar cells that generate electricity that can be used to make hydrogen from water, and can be used to power the ship's propulsion system.

16 Claims, 6 Drawing Sheets

US 10,308,340 B2
Page 2

Related U.S. Application Data is a continuation of application No. 13/716,281, filed on Dec. 17, 2012, now Pat. No. 8,820,681, which is a continuation of application No. 12/290,453, filed on Oct. 29, 2008, now Pat. No. 8,336,810.

(51) Int. Cl.

| | | |
|---|---|---|
| *C25B 1/04* | (2006.01) | |
| *B64B 1/12* | (2006.01) | |
| *H01M 10/46* | (2006.01) | |
| *H02J 7/35* | (2006.01) | |
| *H02S 20/30* | (2014.01) | |
| *B64B 1/06* | (2006.01) | |
| *B64B 1/20* | (2006.01) | |
| *B64B 1/28* | (2006.01) | |
| *B64B 1/32* | (2006.01) | |
| *B64B 1/64* | (2006.01) | |
| *B64B 1/66* | (2006.01) | |
| *B64D 27/24* | (2006.01) | |
| *B64D 41/00* | (2006.01) | |

(52) U.S. Cl.
CPC ............... *Y02E 70/10* (2013.01); *Y02T 50/55* (2018.05); *Y02T 50/62* (2013.01); *Y02T 90/44* (2013.01); *Y10T 137/6906* (2015.04)

(56) References Cited

U.S. PATENT DOCUMENTS

| | | | | |
|---|---|---|---|---|
| 2,362,966 | A | 11/1944 | Bertsch .................. 244/98 | |
| 3,201,065 | A | 8/1965 | Dunn | |
| 3,620,485 | A | 11/1971 | Egon Gelhard .......... B64B 1/00 244/125 | |
| 3,971,533 | A | 7/1976 | Slater ........................ B64B 1/38 244/30 | |
| 3,972,492 | A | 8/1976 | Milne | |
| 4,009,850 | A | 3/1977 | Hickey ..................... B64F 1/14 244/115 | |
| 4,032,085 | A | 6/1977 | Papst ........................ B64B 1/60 244/128 | |
| 4,085,912 | A | 4/1978 | Slater ........................ B64B 1/38 244/115 | |
| 4,238,095 | A | 12/1980 | Slater ............................ 244/115 | |
| 4,272,042 | A | 6/1981 | Slater ........................ B64B 1/38 244/115 | |
| 4,364,532 | A | 12/1982 | Stark ........................ B64B 1/00 126/573 | |
| 4,421,286 | A | 12/1983 | Laky et al. ..................... 244/116 | |
| 4,757,959 | A | 7/1988 | Schroder et al. ................. 244/2 | |
| 4,773,617 | A | 9/1988 | McCampbell ............ B64B 1/60 244/128 | |
| 4,934,631 | A | 6/1990 | Birbas ...................... B64B 1/02 244/125 | |
| 5,143,322 | A | 9/1992 | Mason ..................... B64B 1/60 244/96 | |
| 5,147,429 | A | 9/1992 | Bartholomew ........ B01D 46/42 244/30 | |
| 5,348,254 | A | 9/1994 | Nakada ..................... B64B 1/58 244/30 | |
| 5,368,067 | A | 11/1994 | Cook, Jr. .................. F17B 1/26 137/485 | |
| 5,538,203 | A | 7/1996 | Mellady .................... B64B 1/60 244/100 A | |
| 5,890,676 | A | 4/1999 | Coleman .................. B64B 1/58 244/128 | |
| 6,131,851 | A | 10/2000 | Williams .................. B64B 1/00 244/58 | |
| 6,189,829 | B1 | 2/2001 | Brotz ........................ B64B 1/70 244/24 | |
| 6,311,925 | B1 | 11/2001 | Rist ................................ 244/30 | |
| 6,328,257 | B1 | 12/2001 | Schafer .................... B64B 1/06 244/24 | |
| 6,354,535 | B1 | 3/2002 | Perry ........................ B64B 1/06 244/24 | |
| 6,422,506 | B1 | 7/2002 | Colby ........................ 244/1 TD | |
| 6,527,223 | B1 | 3/2003 | Mondale .................. B64B 1/06 244/125 | |
| 6,581,873 | B2 | 6/2003 | McDermott .............. B64B 1/08 244/24 | |
| 6,648,272 | B1 | 11/2003 | Kothmann ............... B64B 1/005 244/30 | |
| 6,715,712 | B2 | 4/2004 | Boschma, Jr. .......... G09F 21/06 244/115 | |
| 6,722,396 | B1 | 4/2004 | Sillat ........................ B64B 1/58 141/10 | |
| 6,769,493 | B1 | 8/2004 | Fima ....................... A01C 7/085 169/51 | |
| 6,883,749 | B2 | 4/2005 | Boschma, Jr. .......... G09F 21/06 244/115 | |
| 6,896,222 | B2 | 5/2005 | Dossas ..................... B64B 1/62 244/125 | |
| 7,055,778 | B2 | 6/2006 | Eberle et al. .................... 244/96 | |
| 7,073,749 | B2 * | 7/2006 | Krill ........................ B64B 1/02 244/2 | |
| 7,150,430 | B2 | 12/2006 | Silansky et al. ................ 244/30 | |
| 7,275,569 | B2 | 10/2007 | Hobbs ...................... C01B 3/34 141/18 | |
| 7,278,607 | B2 * | 10/2007 | Fuller ....................... B64B 1/14 244/30 | |
| 7,287,558 | B2 | 10/2007 | Hobbs ..................... C01B 3/34 141/18 | |
| 7,287,723 | B2 | 10/2007 | Barnes ............................ 244/31 | |
| 7,303,166 | B2 | 12/2007 | Geery ....................... B64B 1/06 244/30 | |
| 7,318,564 | B1 | 1/2008 | Marshall ......................... 244/58 | |
| 7,354,636 | B2 | 4/2008 | Lavan et al. | |
| 7,356,390 | B2 | 4/2008 | Knoblach ................. B64B 1/40 244/31 | |
| 7,380,750 | B2 | 6/2008 | Eberle et al. .................... 244/96 | |
| 7,611,092 | B2 | 11/2009 | Silansky et al. ................ 244/30 | |
| 7,690,596 | B2 | 4/2010 | Eberle et al. .................... 244/96 | |
| 7,708,222 | B2 | 5/2010 | Lee ........................... B64B 1/50 244/115 | |
| 7,735,777 | B2 | 6/2010 | Zubrin ..................... B64B 1/62 244/31 | |
| 7,967,238 | B2 | 6/2011 | Fuchs et al. ...................... 244/2 | |
| 8,070,096 | B2 | 12/2011 | Wood et al. ................... 244/116 | |
| 8,336,810 | B2 * | 12/2012 | Brutoco ................... B64B 1/06 137/899.2 | |
| 8,894,002 | B2 * | 11/2014 | Goelet ..................... B64B 1/005 244/26 | |
| 8,967,533 | B2 * | 3/2015 | DeVaul .................... B64B 1/40 244/97 | |
| 9,102,391 | B2 * | 8/2015 | Brutoco ................... B64B 1/12 | |
| 9,493,223 | B2 * | 11/2016 | Brutoco ................... B64B 1/06 | |
| 2002/0130220 | A1 | 9/2002 | Sparks ..................... B64B 1/30 244/128 | |
| 2003/0080245 | A1 | 5/2003 | Greenberg ............... B64B 1/58 244/61 | |
| 2003/0141410 | A1 | 7/2003 | Senepart .................. B64B 1/62 244/96 | |
| 2004/0104304 | A1 | 6/2004 | Parmley .................. B64B 1/005 244/30 | |
| 2004/0245382 | A1 | 12/2004 | Nozaki .................... B64D 27/24 244/53 R | |
| 2005/0151006 | A1 * | 7/2005 | Krill ........................ B64B 1/02 244/30 | |
| 2005/0236519 | A1 | 10/2005 | Handley .................. B64B 1/06 244/97 | |
| 2006/0065777 | A1 | 3/2006 | Walden .................... B64B 1/60 244/97 | |
| 2006/0084336 | A1 * | 4/2006 | Howland ................. B32B 5/02 442/65 | |
| 2006/0174965 | A1 | 8/2006 | Hobbs ...................... C01B 3/34 141/18 | |
| 2006/0231678 | A1 | 10/2006 | Nagy ....................... B64B 1/06 244/30 | |
| 2007/0012819 | A1 | 1/2007 | Barnes ............................ 244/30 | |

(56) References Cited

U.S. PATENT DOCUMENTS

| | | | |
|---|---|---|---|
| 2007/0034741 A1* | 2/2007 | Fuller | B64B 1/14 244/58 |
| 2007/0069077 A1 | 3/2007 | Colting | B64B 1/60 244/128 |
| 2007/0102571 A1 | 5/2007 | Colting | B64B 1/06 244/30 |
| 2007/0138006 A1 | 6/2007 | Oakes | B60L 8/00 204/278 |
| 2008/0035787 A1 | 2/2008 | Thompson | B64B 1/24 244/97 |
| 2008/0038061 A1 | 2/2008 | Morse | |
| 2008/0210810 A1 | 9/2008 | Parmley | |
| 2008/0265086 A1 | 10/2008 | Lee | B64B 1/50 244/30 |
| 2009/0302149 A1 | 12/2009 | Fuchs et al. | 244/2 |
| 2010/0102164 A1 | 4/2010 | Brutoco | 244/30 |
| 2012/0018571 A1* | 1/2012 | Goelet | B64B 1/005 244/30 |
| 2013/0037654 A1* | 2/2013 | Zhang | B64B 1/62 244/31 |
| 2014/0048646 A1* | 2/2014 | DeVaul | B64B 1/40 244/97 |
| 2015/0246717 A1* | 9/2015 | Fournier | C25B 1/04 244/30 |

OTHER PUBLICATIONS

PCT Search Report and Written Opinion PCT/US09/53339 dated Aug. 11, 2009 (PCT application corresponding to present application) (supplied in parent case U.S. Appl. No. 12/290,453). Supplied in parent case.

J. Brown & R. Brutoco, "Freedom from Mid-East Oil", 2007 (supplied in parent case U.S. Appl. No. 12/290,453). Supplied in parent case.

File wrapper from parent case U.S. Appl. No. 12/290,453 from Oct. 29, 2008 to Dec. 17, 2012. Supplied in Parent Case.

* cited by examiner

SYSTEM, METHOD AND APPARATUS FOR WIDESPREAD COMMERCIALIZATION OF HYDROGEN AS A CARBON-FREE FUEL SOURCE

BACKGROUND

Technical field of the Invention

The present invention relates generally to the fields of production of carbon-free alternative energy sources, transportation of gases, and aircraft design, and more particularly to a system, method and apparatus employing a specially-designed airship for transporting hydrogen from where it is generated, in a preferred embodiment via geothermal- or wind-powered electrolysis, to where the hydrogen is needed as an alternative energy source. Alternative embodiments of the invention include applications for economical transportation of cargo and passengers, as well as for transporting water to help recharge areas that are adversely impacted by the depletion of traditional glacial and snowpack sources.

Description of the Prior Art

In *Freedom from Mid-East Oil*, a book co-authored by the inventor, the case is made for the proposition that "Humanity now stands at the pinnacle of the Hydrocarbon Age, in which energy is developed by burning . . . hydrocarbons. [. . . ] Hydrocarbons powered all of the advances of the Industrial Age. However, our hydrocarbons of choice —from coal and, eventually, to oil and gas—are wreaking devastation on the ecosystem. Moreover, their dwindling supply makes this form of energy increasingly less viable."

Accordingly, "the most important domestic and foreign policy challenge [we face] is achieving energy efficiency and independence from Middle East oil—and ultimately all imported oil. [. . . ] Oil production is at 99% of full capacity, and . . . increased demand by China, India, and other developing nations will devour any surplus caused by U.S. efficiency measures or economic downturn, keeping oil prices relatively high. From now on, the global demand for oil will grow faster than production capacity . . . . The only nations somewhat protected from economic hardships will be those that take definitive action to achieve energy independence from fossil fuels."

"The hydrogen economy is the only reliable long-term solution to the energy and climate crises confronting civilization. There is now no other technology option that can safely produce clean energy to power transportation systems and our stationary infrastructure to sustain current levels of global prosperity, let alone increase these levels to sustain our fellow planetary citizens."

It is widely known that hydrogen is the most abundant element in the universe, and one of the most abundant on Earth, found in numerous materials including water, natural gas and biomass. In its molecular form, hydrogen can be used directly as a fuel—for example, to drive a vehicle or heat water—or indirectly to produce electricity for industrial, transport and domestic use. The huge advantage that hydrogen has over other fuels is that it is non-polluting since primarily the only by-product of its combustion is water.

Currently, the most common method for producing hydrogen is via the catalytic steam reforming of methane to produce hydrogen and carbon monoxide; and then further reforming the carbon monoxide to produce additional hydrogen, if required. However, natural gas is not a renewable source of fuel, and the steam reforming process to make hydrogen ultimately contributes to the worldwide increase in global emissions of carbon dioxide. Accordingly—although (except for unique conditions as described herein) it is currently more costly—the most promising method of producing hydrogen in the long-term is the electrolytic splitting of water (electrolysis), in which an electric current is passed through water, decomposing it into hydrogen at the negatively charged cathode and oxygen at the positive anode. If the electricity used to split the water is generated from a renewable source such as solar, wind, biomass, wave, tidal, geothermal or hydropower, then there is the potential to sustainably produce hydrogen in a non-polluting manner.

At unique locations where natural geologic or climatic conditions make it possible to economically use such renewable sources to produce electricity, the feasibility of inexpensively producing hydrogen in a non-polluting manner is being demonstrated. For example, the Big Island of Hawaii currently uses geothermal energy to produce more than 15% of its electricity and has the potential of generating 100% if it determines to do so. Hawaii has also successfully demonstrated the use of wind-generated power, and recently approved creating a demonstration project to show the technological and economic feasibility of using excess geothermal power produced during non-peak hours to create hydrogen from water, using electrolysis. This demonstration project, along with a similar project that is being undertaken in Iceland, reveal the potential for using our vast geothermal resources—a clean, renewable, continuous and reliable energy resource produced by tapping the heat stored in the Earth's crust—to produce massive quantities of hydrogen at a far lower cost and reduced environmental impact than by any other process.

However, these places where natural conditions favor the most economical access to such renewable sources for producing hydrogen in a non-polluting manner are not commonly situated in the same location where the largest demand occurs. For example, even on the Island of Hawaii itself, there are significant discrepancies between the location of the major power generators, approximately 85% of which according to a 2006 study conducted by the U.S. Department of Energy Office of Energy Efficiency and Renewable Energy, are concentrated on the eastern side of the Island, versus the locus of the Island's major population and energy consumption requirements, which occurs on its western side.

This challenge of physical separation between the location where hydrogen can be most economically produced from renewable energy sources such as geothermal, wind, wave, tidal or hydropower, and the places where it is (or is likely to be) most severely needed, is typical across the U.S. as well as globally. Accordingly, in order for this low-cost, carbon-free energy alternative to be meaningful beyond the limited number of places where, as an example, molten rock and superheated water and steam occur relatively close to the Earth's surface, will require an improved means for transporting the gas from these geologically ideal production sites to where the hydrogen is most needed as an alternative energy source, but without using high-powered transmission lines or a vast network of hydrogen gas pipelines. Similar needs exist with respect to the natural conditions that favor wind generation; or areas that favor solar, wave, tidal or hydropower-based generation. In each of these cases, nature has created features that favor comparatively low cost, clean electricity generation, the current from which can be used to electrolyze hydrogen from water. Since the technologies for creating, storing, condensing and utilizing hydrogen are well known and widely available, what is missing is a system and method of efficiently and safely transporting the hydrogen from where these natural conditions occur to where there exists a market need for this alternative energy resource.

This need for an improved method to deliver hydrogen from the place where it can be most economically produced with the least adverse environmental consequences to the place where it is needed is emphasized by a paper entitled "*The Future of the Hydrogen Economy: Bright or Bleak.*" Authored by Swiss scientists, B. Eliasson, U. Bossel and G. Taylor. This April 2003 paper (revised in February 2005) analyzes the energy needed to deliver hydrogen using a number of different methods, and concludes that the energy needed to package and deliver the gas to end users would consume most of hydrogen's energy.

In it, the authors write that "hydrogen, like any other commercial product, is subject to several stages between production and use. [ . . . ] Whether generated by electrolysis or by chemistry . . . the gaseous or liquid hydrogen has to undergo these market processes before it can be used by the customer. [ . . .] For reasons of overall energy efficiency, packaging and transport of hydrogen should be avoided if possible. Consequently, hydrogen may play a role as local energy storage medium, but it may never become a globally traded energy commodity. [ . . . ] The analysis shows that transporting hydrogen gas by pipeline over thousands of kilometers would suffer large energy losses. Moreover, in practice, the demands on materials and maintenance would probably result in prohibitive levels of leakage and system costs. Furthermore, the analysis shows that compression or liquefaction of the hydrogen, and transport by trucks would incur large energy losses."

This is the commonly held perception today, and demonstrates the long-standing need for the system, method and apparatus of the present invention.

SUMMARY OF THE INVENTION

The present invention relates to efficiently transporting hydrogen from where it can be economically made to where it is most needed using specially designed airships. Technologies such as geothermal, wind, solar, wave tidal or hydropower can be used to generate electricity in-situ or very near to the primary energy sources. This electricity can then be used to produce hydrogen directly from water through various methods known in the art.

The present invention then utilizes an improved means to deliver hydrogen from the place where it is produced to the place where it is needed using an airship in which the hydrogen gas can also be used for generating lift, providing propulsion energy and serving ancillary needs. In other embodiments of the invention, the airship of the present invention can be used to dramatically reduce the cost of transportation of freight, the cost of passenger transportation, and to save on the area required for landing at the points of loading and embarkation, and unloading and debarkation. And in another embodiment, the airship of the present invention can be used for transporting water to areas that are adversely impacted by low rainfall and the depletion of traditional glacial and snowpack sources, and for transporting food and supplies from areas where such goods are plentiful to more remote areas that must import them.

BRIEF DESCRIPTION OF THE DRAWINGS

FIG. 2A shows a possible embodiment of the mounting of a flap.

FIG. 2B shows an embodiment of the mounting of a rotatable engine.

FIG. 2C shows the use of a drone device to accomplish docking.

DETAILED DESCRIPTION OF THE INVENTION

The present invention relates to a system and method of using natural locations where the existence of geothermal, wind, solar, wave, tidal or hydropower-based conditions favor the generation of electricity that can be used to generate hydrogen from water using electrolysis, and then employing specially designed airships to transport that hydrogen gas from the location where the gas is produced to the place where it is needed as an alternative fuel source. Because the airship contains hydrogen gas, which is approximately 14 times lighter than air, the craft can carry quite a substantial payload, which in a preferred embodiment is at least a substantial quantity of hydrogen gas itself as a payload.

The craft's maneuverability in taking off, landing and changing directions is enhanced through one or more engine mounts that permit the preferably hydrogen-fueled engines to rotate and pivot so that they provide upward or downward thrust, either vertically or at an acceptable angle of ascent or descent, as well as in a lateral plane so that the engines may act like thrusters on a boat.

Figure 1:
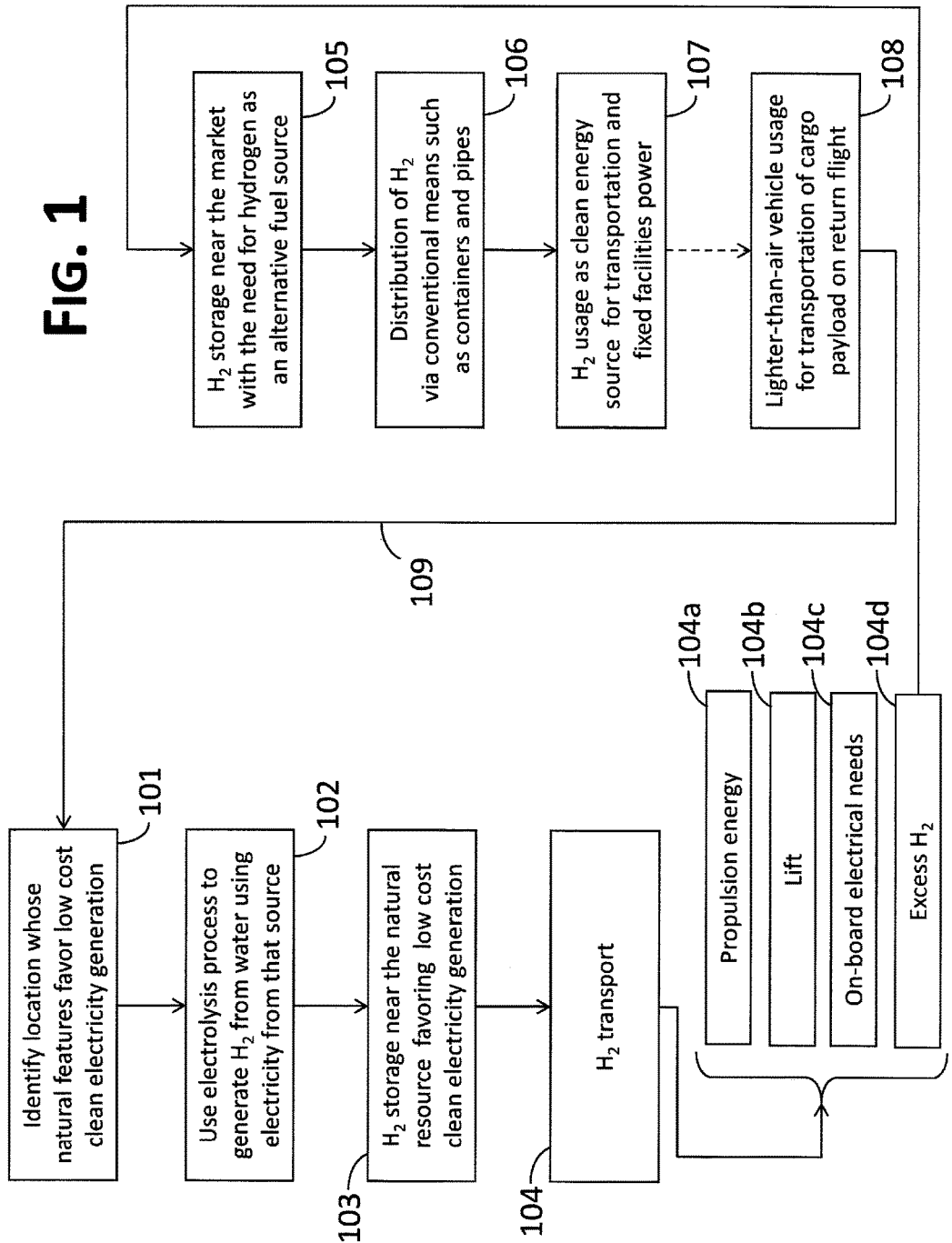
FIG. 1 is a block flow diagram illustrating how the system of the present invention may be used to produce and transport hydrogen from the place where the gas is generated to the area where the hydrogen is needed as an alternative energy source.

Turning to FIG. 1, a block flow diagram can be seen illustrating how in one embodiment, the present invention may be used to produce and transport hydrogen from the place where natural conditions favor the clean, comparatively low cost production of electricity that can be used to generate hydrogen from water via electrolysis, to the area where the hydrogen is needed as an alternative energy source. Block 101 indicates that the first step involves the identification of a location where the natural conditions or features favor comparatively low cost, clean electricity generation.

There are a number of places where such favorable natural conditions are present. These include places where substantial electricity is presently being generated on a commercial scale, such as in Hawaii, Iceland and Northern California, where molten rock and superheated water and steam occur relatively close to the Earth's surface, or where adequate heat can be tapped such that injected water to the heat source can economically generate electricity, in each such case thereby favoring geothermal production of hydrogen from such electricity in a preferred embodiment of the invention In other embodiments, the location may rely upon favorable conditions for wind generation, such as along the North Sea, the southern tip of South America, the Australian island of Tasmania, and certain locations in North America where relatively continuous high wind velocity is present. Alternatively, it may relate to ideal solar conditions, such as in the Pacific Ocean, south of Hawaii, in the Sahara, the nation of Niger, and certain parts of Australia; as well as locations that are ideally suited to power generation from wave energy, tidal flow production, and hydropower, which power is then converted into hydrogen.

Block 102 indicates that at one or more of these locations where nature has created features that favor comparatively low cost, clean electricity generation, known technologies are used to generate hydrogen from water using electrolysis. Block 103 illustrates that the hydrogen gas generated by this means will be temporarily stored on site or in close proximity to where it is produced, pending the arrival of a suitable transport vehicle. In step 104, the hydrogen is transported from the place where these natural resources occur—which is often in a relatively remote location—to places where there is a market need for this alternative energy source.

As illustrated by blocks 104a through 104d, the preferred method of transporting the hydrogen uses the hydrogen itself to provide propulsion energy for the craft, 104a; and takes advantage of the lighter-than-air quality of the gas to provide lift, 104b, thereby materially reducing the energy needed for transporting the payload. Additionally, the preferred method for transporting the hydrogen also utilizes the hydrogen for all on-board electrical ancillary needs, 104c. Accordingly, through practicing the present invention, the excess hydrogen, 104d, can be delivered to the location where the gas is needed as an alternative energy source with little to no carbon-fuel consumption. In a preferred embodiment of the invention, these attributes are fulfilled by a specially designed airship 200 such as described with regard to FIG. 2, below.

Once at the desired destination, the excess hydrogen, 104d, can be moved off the airship to storage, illustrated by block 105. From this storage location, the hydrogen can be combusted at an electricity generating plant or distributed to other end use locations using conventional means such as pressurized and non-pressurized portable containers and pipelines, illustrated by block 106, to both resellers and/or end users of the clean energy source. This step is in turn illustrated by block 107. Block 108, entitled "Lighter-than-air vehicle usage for transportation of cargo payload on return flight," illustrates another principle of one preferred embodiment, which involves utilizing the craft's return flights for the purpose of carrying passengers and/or a cargo payload, as illustrated by line 109, particularly where such payload may be useful to fulfilling particular needs associated with the location of the natural features that favor low cost clean electricity generation referenced in block 101. In particular, a return flight (or any flight) can carry water, food or other cargo necessary for life from a location where it is abundant to a location where it is needed.

Figure 2:
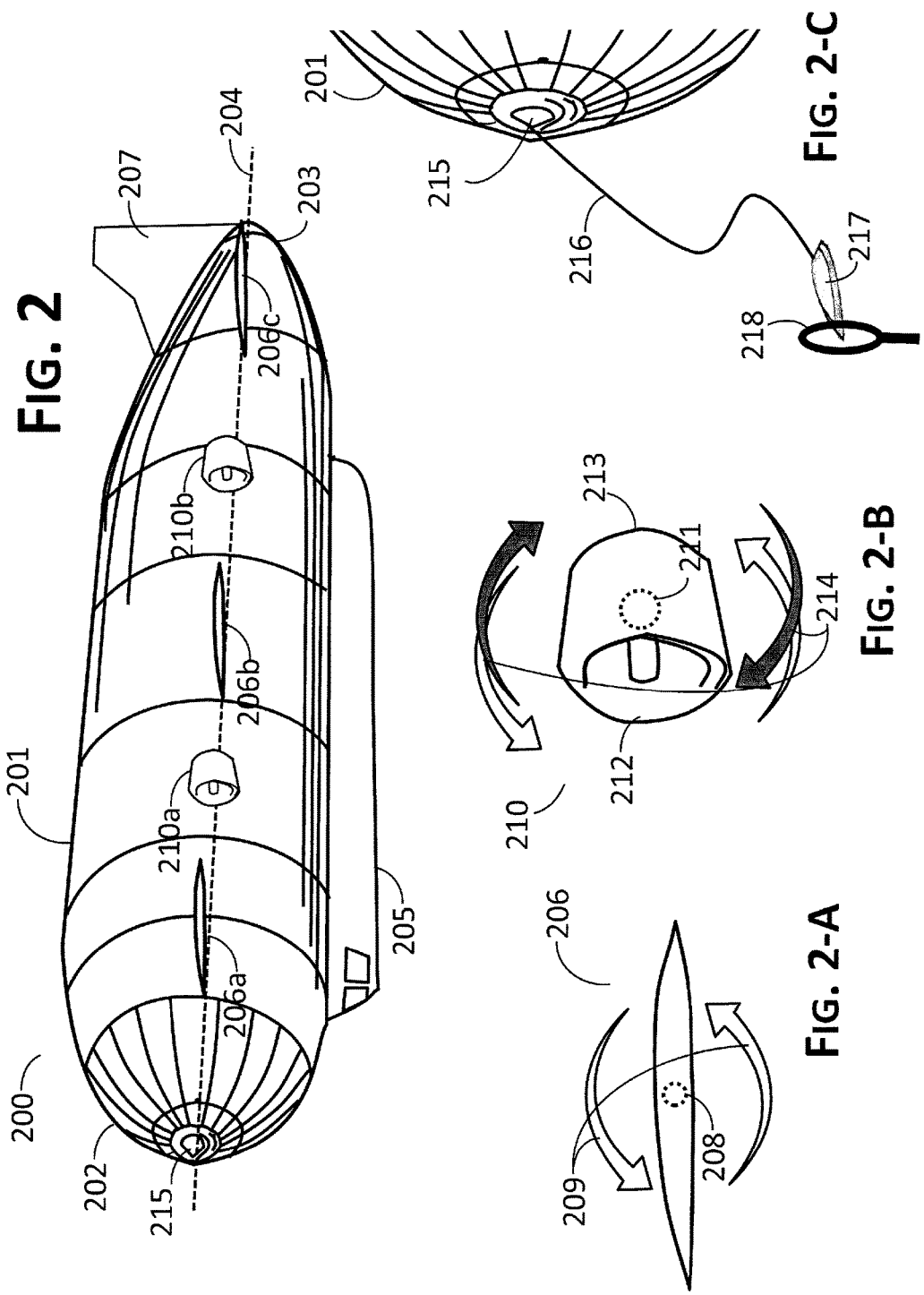
FIG. 2 depicts an exterior side-view of an embodiment of an airship according to the present invention.

Turning next to FIG. 2, it will be observed that FIG. 2 depicts an exterior side view of an embodiment of an airship 200 according to the present invention. The airship 200 preferably includes an exterior shell 201 having a front portion 202, a rear portion 203 and a main axis 204. According to one embodiment of the airship 200, the exterior skin 201 may be made from a carbon fiber composite, film laminate or an equivalent material such as KEVLAR™ or other high-strength ballistic nylon, and/or may be coated with fluorocarbon polymer such as TEFLON™ or other similar materials that will minimize the overall weight of craft 200 while at the same time providing a protective outer coating and minimal air resistance. KEVLAR and TEFLON are registered trademarks belonging to the DuPont Corporation of Wilmington Del. Any material with suitable properties for forming an exterior skin is within the scope of the present invention.

Bodies that generate lift, and/or the term lifting bodies, refers to an aircraft configuration where the body of the craft itself (with or without wings) produces lift, such as a fuselage that generates lift without the shape of a typical thin and flat wing structure. Lifting bodies generally minimize the drag and structure of a wing, and provide the best trade-off in terms of maneuverability and aerodynamics. Thus, in a preferred embodiment, the exterior shape of airship 200 will be designed to apply the principles of lifting bodies to conventional dirigible design.

FIG. 2 also shows one or more optional external flaps, 206a and 206b, located on each side of the craft along main axis 204; and 206c at the rear that can function as an elevator flap. Additionally, one or more optional single rudder, dual rudders or other stabilization methodologies, collectively 207, are located at the rear of the craft or other appropriate locations for enhancing stability and in order to help steer the craft. As illustrated in FIG. 2-A, each external flap 206 is preferably mounted so that it can be rotated around a pivot 208, and raised or lowered according to arrows 209 in order to provide additional lift during ascent and stability during descent of the craft.

In a particular embodiment of the present invention, the airship 200 may further include one or more external motors, 210, which may be a jet, turbojet, rotary blade, or propeller-type engine that is preferably powered by hydrogen as its energy source (but in alternative embodiments that may be powered by jet fuel, gasoline, diesel or electricity, including from solar cells mounted on the craft's exterior). According to the embodiment illustrated in FIG. 2, external motors 210 may be mounted along the main axis 204, or optionally may be attached to the gondola 205, to one of more or external flaps 206, or to the rear portion 203 of exterior shell 201.

Another advantage of the airship 200 is that, as illustrated in FIG. 2-B, each external engine 210, can be optionally mounted so that it can be rotated around one or more pivots 211, and turned according to arrows 214. This optional feature will permit external engines 210 to be turned so that the leading edge of the engine 212 can be directed along the main axis 204, perpendicular to that axis for take-off or landing, and at any angle to help speed ascent or descent of the craft. Additionally, in a particular embodiment, external engines 210 may be rotated laterally with the rear edge of the engine 213 directed away from the craft, to help maneuver the airship sideways in the manner achieved by thruster engines in a boat.

The exterior of the craft 201 may be formed of a substantially rigid material such as carbon fiber or any other suitable light weight material; or alternatively any number of readily available flexible and/or microfiber-based composite materials; or any other hydrogen and helium retentive materials. Although in an alternative embodiment, lighter-than-air craft 200 may employ a semi-rigid design (e.g., employing some internal support such as a fixed keel), in a preferred embodiment, the craft can employ a rigid (e.g., with full skeleton) design. However, unlike the rigid design of older airships such as the Zeppelin, which were constructed with steel members, the internal structural elements employed in carrying out the design for airship 200 will preferably employ materials having the dual qualities of being lightweight and extremely strong, such as carbon fiber or nanotubes, graphite, aluminum and various composite materials that are well known in modern aeronautical design. Any material that is structurally strong and also light is within the scope of the present invention.

One of the historical challenges of operating a lighter-than-air craft is to control the ship's landing, particularly in cases where the landing area is tight and/or where weather conditions such as high winds in or near the landing area may make it exceedingly difficult to control a craft having such a large surface area. In order to overcome this challenge, FIG. 2 depicts that the lighter-than-air craft 200 can include a reinforced connector 215 for a lightweight guide-wire cable or tie-line. This optional feature is further illustrated in FIG. 2-C, which shows that guide-wire cable 216 may be physically attached to connector 215 at an appropriate point at or near the front of craft 200.

A pole higher than at least half the diameter of the craft can be equipped with a gimble on its top that can swivel to any angle. The attachment point 218 can be mechanically coupled to this gimble. Once the lightweight guide-wire 216 engages the attachment 218, a larger diameter tie cable can be fed through the attachment 218. The craft can then be reeled in and tied to the gimble so that it can align itself with the prevailing wind much as a sailboat on an anchor. The aft end of the craft can then be stabilized, either with an additional tie-down or with another pole.

In order to direct the first guide-wire 216 into the attachment 218, a small, remotely controlled unmanned, aerial vehicle (also known as a "UAV" or "drone" craft) or a projectile fired from the airship for the same purpose, such as illustrated by craft 217 may be attached to the other end of guide-wire cable 216; and such UAV may be flown to the landing area where guide-wire 216 can be tied to stationary curb 218, and a hoist (not shown) may used by ground personnel to reel-in and safely secure craft 200. The UAV craft may be flown by wireless techniques such as radio or light, or by fly-by-wire where electrical signals are sent to it using either a small electrical cable that runs along the guide-wire 216 (or that is the guide-wire), or by using a fiber optic cable that runs with the guide-wire 216 (or is the guide-wire). The UAV craft may be piloted from a remote console by the dirigible's pilot or a landing officer. The drone 217 could be made maneuverable using airfoils and powered with a small engine, all as is known in the art. The drone 217 or projectile could contain a video camera, radar or other sensing or navigation device such as GPS. The drone 217 can be configured to hover or fly straight as needed for docking the larger craft. A fired projectile, on the other hand, could be fired into a receiving port that could optionally be equipped with an electromagnetic field. While several methods and techniques for tethering and docking the large craft have been presented, any method of docking or attaching the craft to a tie-down or support is within the scope of the present invention.

FIG. 2 shows an embodiment of the lighter-than-air craft of the present invention. Many other shapes are possible. In some embodiments, the craft can be cigar-shaped with a pointed or "needle" nose. The craft can also have a sharply tapering tail. Designs with these features typically have lower drag coefficients that result in higher speeds with lighter engines. To increase the payload on such a design, the craft can be lengthened. FIG. 2 also shows the craft with a gondola 205. The use of a gondola is optional to carry crew, passengers or cargo. In some embodiments of the present invention, all of the payload can be carried in a gondola. In other designs, the craft may have no gondola or a small gondola simply for crew with all most or all the payload being carried inside the main hull. A gondola 205, if used, may be pressurized for high altitude flight (typically flights above 14,000 feet above sea level will require pressurization).

Figure 3:
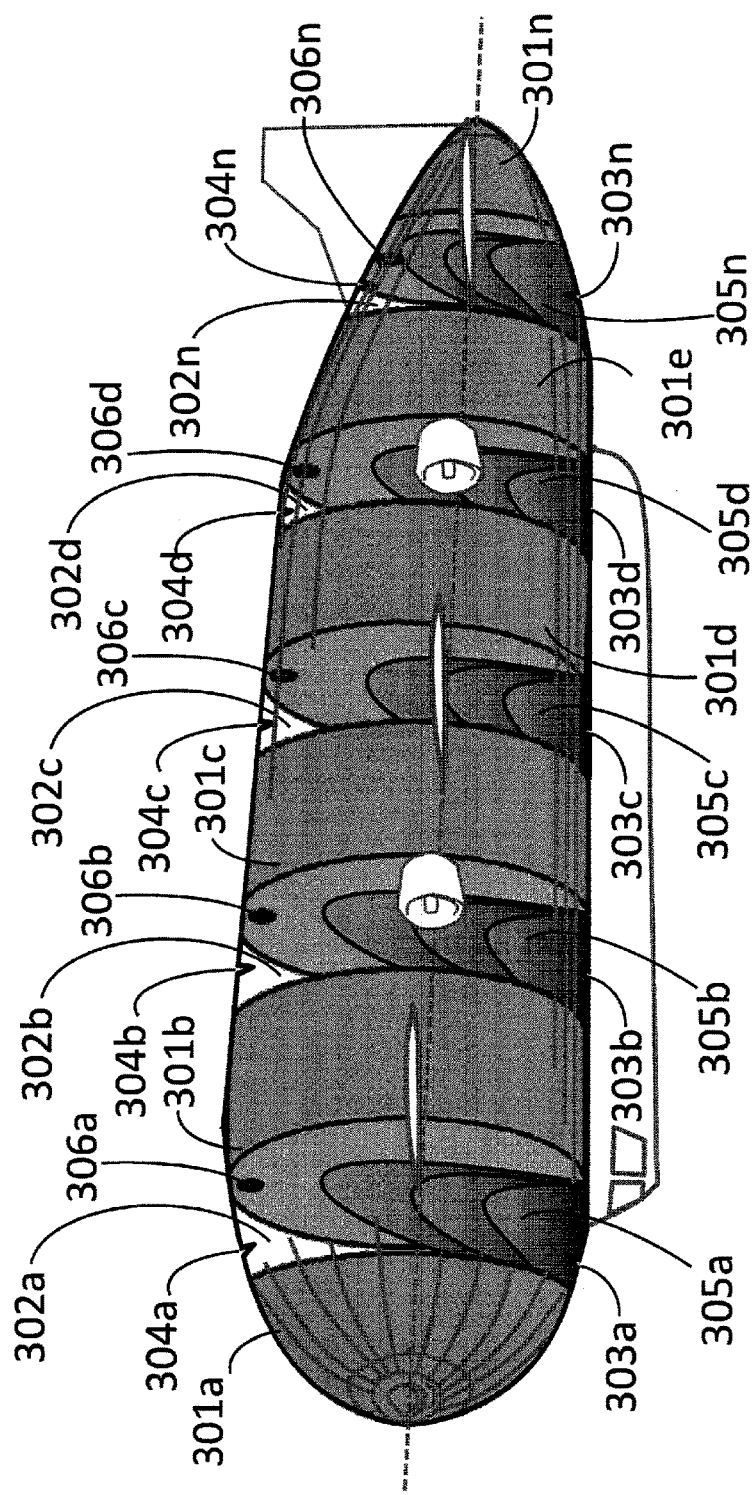
FIG. 3 is an interior side view of the airship of FIG. 2, showing hydrogen storage compartments and a controlled bladder system.

Now turning to FIG. 3, an interior side view of the embodiment of the airship 200 shown in FIG. 2 can be seen. Inside the craft, one or more hydrogen storage compartments 301a-301n, are preferably alternated with at least one or more chambers or compartments 302a-302n. The hydrogen storage compartments can 301a-301n can be high pressure storage tanks or other storage devices. Thus, whereas the traditional lighter-than-air craft may use a suspended structure generally corresponding to gondola area 205 shown in FIG. 2 for carrying its payload (a technique that can be used with the present invention), in many embodiments of the present invention, storage compartments or tanks 301a-301n are able to be filled with hydrogen, preferably in either a compressed or liquefied form as a payload. Chambers or compartments 302a-302n can contain a system of bladders 305a-305n that are able to be filled with hydrogen or helium to afford the additional lift needed to achieve buoyancy once at the desired flight altitude.

Each of chambers 302a-302n generally includes an inlet valve or vent, 303a-303n, and an outlet valve or vent, 304a-304n, respectively; however, in many embodiments of the invention, these may be the same, and there may only be one set of openings or vents. The housing of chambers 302a-302n may consist merely of the exterior walls of hydrogen storage compartments 301a-301n and the interior walls of shell 201; however, it is also possible that they can be constructed from a separate flexible liner made of appropriate microfiber-based composite materials or other hydrogen and helium retentive material. As shown in FIG. 3, a bladder system 305a-305n can be disposed inside chambers 302a-302n, respectively, to divide the portion of each such chamber served by the valves or vents. These bladders can be made of flexible microfiber-based composite materials or any other hydrogen and helium retentive materials, but in alternative embodiments may be plates or bags made of polyvinyl chloride, polypropylene, or any other suitable materials. Any hydrogen or helium retentive material may be used to construct the bladder system and is within the scope of the present invention. The bladders 305a-305n, in effect, can act as inflatable bags or accordion type structures using fixed elements and flexible material.

Figure 4:
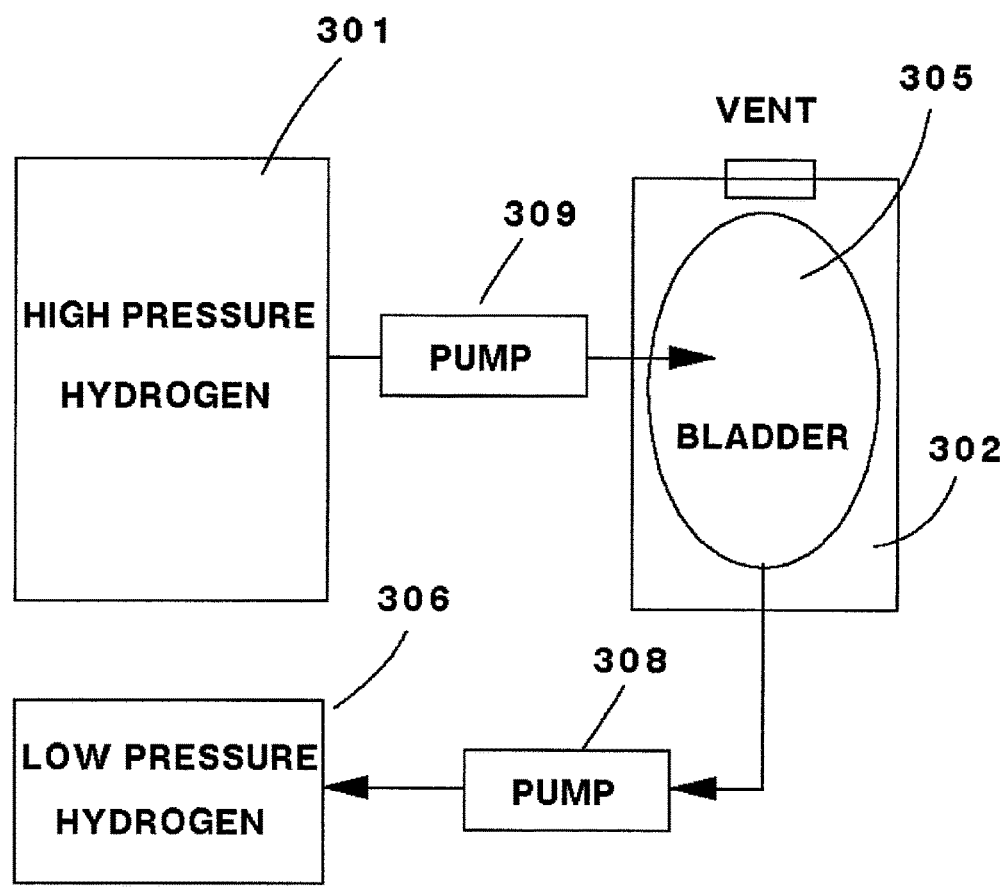
FIG. 4 shows a tank/bladder system.

Generally, each set of compartments 301a-301n can contain at least one high pressure hydrogen tank 301 (as is also shown in FIG. 4) while compartments 302a-302n can contain one or more bladders 305a-305n. One or more, lower pressure hydrogen tanks 306 can be connected to the outlet of each bladder. When additional lift or trim is desired, high pressure hydrogen can be vented or pumped 309 from a high pressure tank into a particular bladder 305 expanding it. As the bladder 305 expands in the compartment or chamber 302, air at ambient pressure is forced out of the compartment. When less lift is desired, a pump 308 can take hydrogen out of the bladder 305 causing the bladder to collapse and force it into the second, lower pressure hydrogen tank 306. In this manner, no hydrogen is mixed with air, vented or wasted. The low pressure hydrogen can simply be saved in the lower pressure tank, transferred to another tank, ducted to engines to as a fuel, or it can be pumped back into the high pressure tank using a second, high pressure pump. As a bladder collapses, air at ambient pressure is drawn in from outside the craft. In an alternative embodiment, the excess hydrogen can also simply be vented to the atmosphere.

The bladder system described can selectively increase or decrease the ratio of hydrogen to air in the chambers 302 to control the amount of lift the craft achieves at every altitude while ascending and descending taking into consideration the changing atmospheric pressure that naturally occurs when a craft ascends and descends. This feature can be controlled automatically by a computer program running on a typical computer, server or other processor known in the art which can simultaneously monitor external ambient pressure based upon the altitude of the ship, the desired direction and speed of ascent or descent, and the lift being achieved, so as to optimize the flow of hydrogen to and from one or more bladder or accordion chambers.

The unique configuration of these chambers or compartments, the flexible bladder system and available hydrogen supply will, in conjunction with the outside engines 210, airfoils and the optional computer control, permit the bladder system to be used to adjust the quantity and pressure of the hydrogen or helium gas in the chambers to be sufficient for the overall weight of the craft and its payload (including compressed or liquefied hydrogen in storage tanks) and the desired rate of climb to altitude, descent from altitude, and/or maintaining relatively neutral buoyancy once the desired flight altitude is attained.

The bladder system described allows simultaneous control of both lift and fore-aft trim. When the craft is not moving horizontally, adjustment of bladders in different parts of the ship allow trim control. After the craft acquires a horizontal speed, trim can also be controlled by the airfoils and engine directions as described. At altitude and speed, the bladders can be set to achieve approximately neutral buoyancy with trim and with part of the lift then being provided by the structure itself according to aeronautical principles with trim being almost exclusively controlled by the airfoils and the engine directions. In general, the craft of the present invention ascends and descends at relatively slow horizontal speeds relying on buoyancy control and moves at high horizontal speeds at altitude for long distance travel relying on airfoils and engines for thrust and/or control.

In accordance with the principles of the invention, the foregoing system, method and apparatus is capable of lifting an enormous amount of weight—on the order of 100 tons (200,000 lbs.) or more—and of transporting its payload of hydrogen or other cargo over long distances to where it is needed with comparatively low cost with negligible to no consumption of carbon-based fuel, and at a speed that is many times faster than via ocean tanker. The craft of the present invention may travel at speeds as high as several hundred miles per hour at high altitudes.

The present invention has many advantages over the prior art including the fact that the airship is able to land on an area that is only slightly larger than the size of the craft itself and to take off again with only modest ground facilities or refueling. Another advantage is that once the maximum capacity (by volume) of hydrogen storage tanks $301a$-$301n$ is reached, the additional lifting capacity of airship 200 may be used to carry a payload of freight and/or passengers in gondola area 205 at nearly zero incremental cost. Yet another advantage is that rather than being required to "dead-head" return flights, merely by filling hydrogen storage tanks $301a$-$301n$ and chambers $302a$-$302n$ with a sufficient quantity of hydrogen or helium for the return flight, such flights may be used in a conventional fashion, either for freight or passenger transit using gondola 205 and any cabins or storage holds built into this area.

In another embodiment of the present invention, some portion or all of storage compartments $301a$-$301n$ may be specially adapted to be filled with water. So outfitted, the ship may be utilized counter-cyclical to its use for transporting hydrogen as previously described for moving large quantities of water, such as in connection with areas where climate change has reduced runoff from traditional snowpack or glaciers. In these cases, the airship may be used to serve upstream locations for which there presently exists no economic means of reverse-gravity flow. In such instances, the flexible bladder system of the instant invention or the cylinders dedicated to compressed hydrogen used in other embodiments can be adapted for the purpose of holding large quantities of water or other liquids.

The present invention is very versatile for widespread commercialization of hydrogen as a carbon-free alternative fuel source in that it can be tailored to accommodate numerous different operations. Thus, for example, whereas a particular embodiment may entail the use of the craft to economically transport payloads of water, the lighter-than-air ship may also be used to transport various cargo payloads. Hence, in the case of the foregoing example of Hawaii, an island blessed with geothermal and wind resources that may fuel the production of hydrogen that could be transported to California for use, on the return flight, the ship may be used to transport tourists and/or large quantities of food and paper goods that are presently being shipped from California to Hawaii. This practice may be applied in any number of ways that is tailored to the particular socio-economic and political-geographic needs.

Several examples will now be presented in order to illustrate the concepts of the present invention. The scope of the present invention is not limited to the numbers or quantities expressed in these examples. Straight hydrogen gas lift will be first considered, followed by the power required to achieve high speeds at altitude. Simplifying assumptions will be made.

As part of the first example, consider an airship according to the present invention designed to lift a maximum weight of 400,000 lbs.; cruise at an altitude of 39,000 feet; and maintain a maximum speed of 100 MPH at that altitude. Assume the craft has the shape shown in FIG. 1 with a maximum diameter of 300 feet and a length of 1700 feet. For simplicity in this example, this will be considered to be a cylinder of these dimensions. The volume of such a cylinder is 120,165,919 cubic feet, or approximately 3,402,720 cubic meters.

Air at sea level has a density of around 1.225 kg/cu meter, and at 39,000 feet, a density of around 0.316406 kg/cu meter according to the standard atmosphere model. Thus, at sea level, 3,402,720 cu. meters of air weighs about 4,168,332 kg, and at 39,000 feet, it weighs about 1,076,641 kg. It is well known that a body possesses lift (positive buoyancy) when the weight of its displacement is greater than its total weight. The total lift force is the weight of its displacement of air minus the total weight.

Molecular hydrogen gas has a density of around 0.08988 kg/cu meter. Thus, if the entire cylinder was filled with hydrogen gas, the gas would weigh about 305,836 kg. The lift at sea level would be 3,862,496 kg and at 39,000 feet 770,805 kg. This results in a lift of 8,515,339 lbs. at sea level and 1,699,332 lbs. at 39,000 feet for the example given.

Of course, the ship is not a cylinder as assumed in this example, and the entire structure would not be filled with hydrogen gas. However, it can be seen that even neglecting these simplifying assumptions, at altitudes much greater than 39,000 feet, there is entirely adequate gas lift using this size ship for a total craft weight, including payload, of 400,000 lbs. or greater.

The next example will consider speed at altitude, again 39,000 feet for this particular case. It is well known that to maintain a particular speed in a fluid, the thrust force must equal the drag force. Drag force is equal to ½ times the drag coefficient times the density times the cross-sectional area times the speed squared. Thus drag, and hence required thrust, increases (or decreases) linearly with density and area, and quadratically with speed.

The drag coefficient is independent of area, density or speed and is related only to the type of flow and the shape of the body. Since the air density at 39,000 feet is thin, the assumption will be made that the type of flow is laminar with a boundary layer. The drag coefficient for a bullet slug shaped object (both ends) in this type of flow is around 0.3 (in contrast, an extremely aerodynamic airfoil at zero angle of attack has a drag coefficient of around 0.045). If the object is made narrower (more cigar-shaped), the drag coefficient decreases significantly.

Again, assuming a diameter of 300 feet (or radius of 45.72 meters) with a double bullet shape, the cross-sectional area is about 6,467 sq. meters. 100 MPH is 45 meters/second. Using the density of air at 39,000 feet from the standard atmosphere of 0.316406 kg/cu meter, the drag force is 622,860 Newtons, or 140,024 lbs. This thrust could be supplied by several conventional jet engines.

Much higher speeds can be attained with a cigar-shaped craft. Consider again for example a cigar-shaped craft of 100 feet in diameter with a friction coefficient of 0.17. In this case, the thrust required to maintain 350 MPH is 108,000 lbs. This could be supplied by several conventional jet engines. A craft 100 feet in diameter with a length of 4000 feet configured as a cylinder totally filed with hydrogen could lift 2,226,232 lbs. at sea level and 444,269 lbs at 39,000 feet. Thus, in this example, a speed of 350 MPH is attained at altitude while still lifting 222 tons of total weight to that altitude. A pointed or "needle" nose and tail would add further to the aerodynamic efficiency.

The above-discussed examples clearly show the feasibility of constructing a hydrogen carrying craft that could lift 100 tons to 39,000 feet and maintain 300 MPH at that altitude with only two engines. The examples show an abundant lift capacity to lift the weight of the engines and payload as well as the structural weight of the proposed craft.

As stated, in the preferred embodiment of the present invention, the engines in the preferred embodiment burn hydrogen (perhaps from a tank of highly compressed or liquefied gas). The engines can also run on non-conventional fuel such as hydrozine. Such engines are generally much lighter than a conventional jet engine and will provide adequate thrust for the craft of the present invention. Total drag can be minimized by reducing the diameter of the craft, using a pointed nose and possibly tail. The payload carrying capability can then be increased by lengthening the craft. The craft can thus be lengthened (within the bounds of structural stability) to tradeoff payload carrying capacity against engine and possibly fuel weight.

Figure 5:
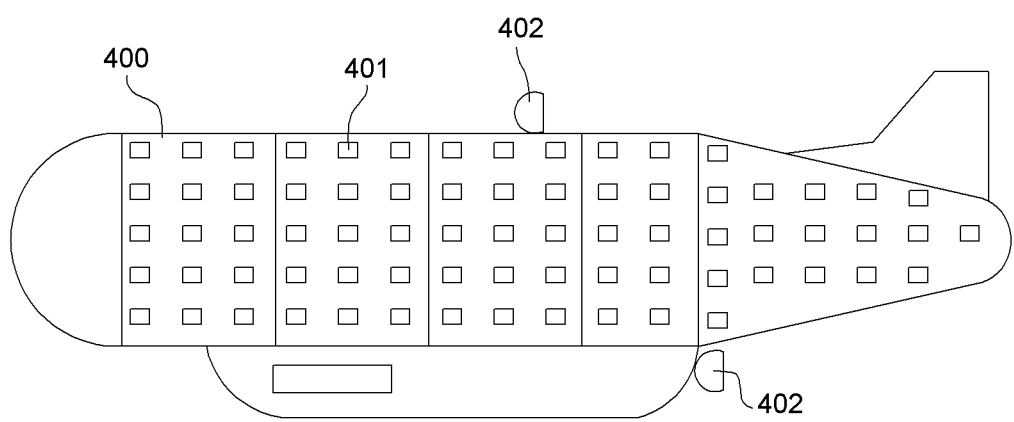
FIG. 5 shows an alternative embodiment of the airship with a plurality of solar cells.

An alternative embodiment of the present invention is shown in FIG. 5. Here, the outside surfaces 400 of the airship include numerous solar cells 401 that can be mounted individually or belong to a series of panels. These solar cells can be used to power electric motors 402 and other equipment aboard the ship. Typically, the solar cells 401 charge a battery or system of batteries in order to provide a constant source of electric power. This embodiment can use the hydrogen or helium bladder system previously described with pump motors being powered by energy from the solar cells. In this system lift gas is released into inflatable bladders to provide lift for the ship. When less lift is needed, the gas from the bladders is recovered and stored in a low pressure storage system.

Models of the embodiment of FIG. 5 can be designed for the sole purpose of generating and storing electricity. In this case, they can be smaller than the airships described in previous sections. These smaller ships can be completely maneuvered with the electric motors 402 and require no additional energy to stay aloft or change position. The onboard-generated electricity can be used for control surfaces, lift gas pumps, motors, control surfaces and all other power requirements. The amount of power available depends on the total ship surface and the density of the solar cells. In a totally dense solar cell system using state of the art cells, the area power density can be has high as 175-200 Watts/Sq. meter in bright sunlight. As a crude example, a cylinder 10m in diameter and 50m long has a total surface area of approximately 2927 sq. meters. Since the entire surface cannot see bright sunlight at the same time, the calculation should be de-rated about 50%. At 175 Watts/sq. m, the cylinder (de-rated 50%) has a potential power output of approximately 256 kWatt. Of course in cloudy conditions, this can drop substantially; however, such ships have the capability to operate above a considerable portion of any cloud cover, hence seeing more sunlight more of the time than a ground-based solar cell operation.

Figure 6:
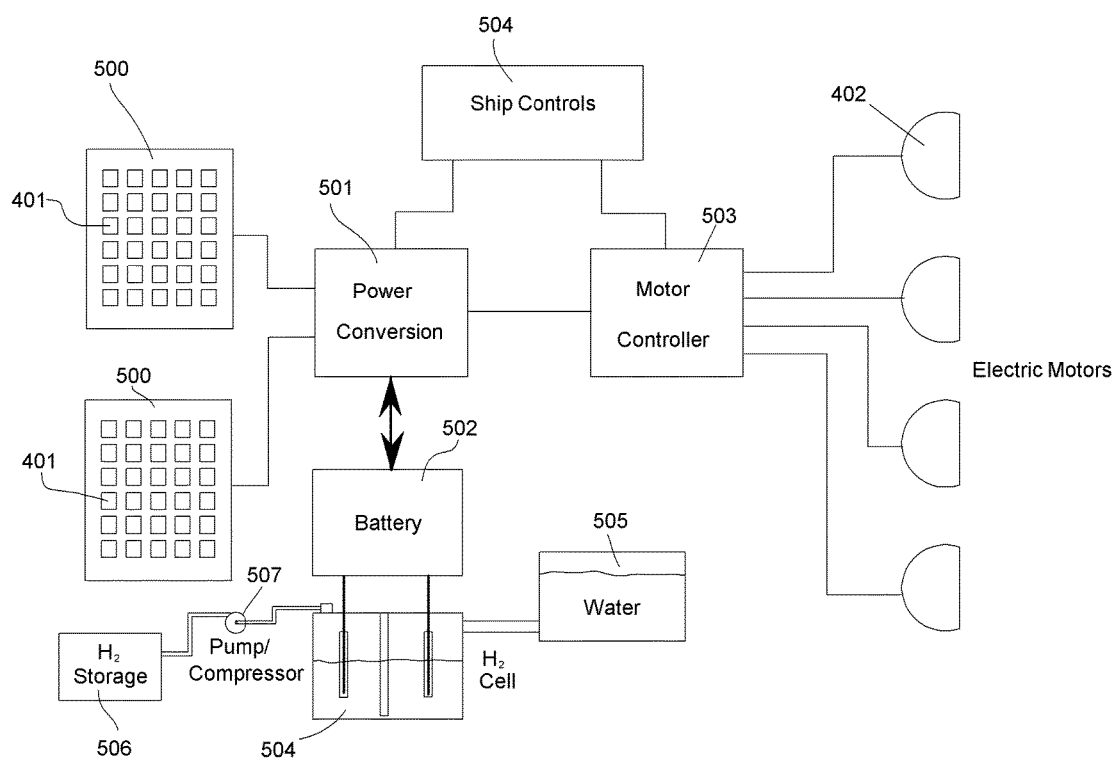
FIG. 6 shows a block diagram of the embodiment of FIG. 5.

FIG. 6 shows a block diagram of the embodiment of FIG. 5. The solar panels 500 contain numerous individual solar cells 401. The output of the cells is variable and depends upon the amount of light impinging on them. The variable DC voltages of the panels can be equalized and converted to a battery charging voltage by a power conversion unit 501. This unit can supply charging current to the battery 502 and also take battery voltage from the battery 502 and supply it to a motor controller 503. The motor controller 503 can be selected by ship's controls 504 on the bridge to run one or more electric motor 402. The bridge can also signal the power conversion unit 501 to supply electric power of prescribed voltage to other ship systems.

Solar cells in panels typically output a voltage of between 0 and 17 volts depending upon conditions. The power conversion unit 501 must take this variable voltage from the several solar cell panels and condition this to a constant battery charge voltage. Typically battery cells operate at around 11.2 to 12 volts and are charged from around 12.2 to 13.3 volts. The power conversion circuit can make this conversion by chopping each panel's output voltage, running it through a transformer at a chop frequency of between 50-500 kHz into a rectifier and DC filter/regulator. The regulator can be designed to supply a constant 13 volts to a 12 volt battery system (similar to what is done in an automobile). Batteries can also optionally be stacked in voltage (connected in series) with the result of higher operating voltages and charging voltages. While this is an example of power conversion, any method or technique of converting solar cell output power into battery charging power is within the scope of the present invention.

Since the batteries and solar cells produce DC voltages, it is usually the most efficient to power the entire ship electrical system on DC. Nevertheless, there may be situations where conventional AC power is needed (in the case of devices such as radar, measuring equipment, radio transceivers and the like). An optional circuit in the power conversion unit 501 can take the final DC voltage and convert it to AC using known inverter techniques. Thus, all or part of the ship can be optionally powered with conventional AC power.

The motor controller 503 is constructed to take a constant DC voltage of 12 volts from the batteries 502 (or other convenient voltage) and drive the DC motors 402 with whatever each motor requires in terms of voltage and current. Motor controllers and motor drivers are known in the art and can be used with many different types of motors including even AC motors.

The ship controls 504 can be constructed to not only select which motors 402 will run at any particular time, but can also control the tilt and pan of the motors (their direction of thrust). This optional feature can be coordinated by the motor controller 503 or by totally separate circuits.

The embodiment of a hydrogen or helium airship with external surfaces covered with numerous solar cells offers an opportunity to generate and stores considerable power very efficiently. This DC electric power can be used to produce hydrogen from water with a byproduct of oxygen. With ample DC power, this method of producing hydrogen is very clean and economical. Thus, the electric power from the solar cells can be used to product either lift gas, or to simply store hydrogen. In the case of a ship designed to produce excess hydrogen, the ship can be operated at altitudes that are above most cloud covers especially if hydrogen is used as the lift gas. The electric power produced can then economically produce more hydrogen that can be stored under pressure from electric pumps and compressors for later exchange or use. The ship becomes self-sustaining in terms of lift gas while producing all of its own propulsion power and producing extra commercial hydrogen.

FIG. 6 shows DC power from the battery 502 driving a hydrogen conversion cell 508. This cell is of the simplistic type where water enters from a water reservoir 505 to experience two submerged electrodes. Hydrogen gas is produced at one electrode, while oxygen is produced at the other. The oxygen can optionally also be stored, or it can be cleanly vented to the atmosphere. Hydrogen is removed from the cell 508 and pumped/compressed into a hydrogen storage tank 506 or other facility. The pump/compressor 507 can be operated by electricity from the battery 502 or the power conversion unit 501.

Although, as mentioned above, all of the features of the system are not required in order to practice the principles of the invention and thus some are optional. It is deemed apparent that each of the features illustrated in the accompanying drawings and the foregoing description are attractive and add to the usefulness of the invention. Additionally, although the disclosure hereof has been stated by way of example of preferred embodiments, it will be evident that other changes and modifications may be employed without departing from the spirit and scope thereof. Each of these changes or modifications is within the scope of the present invention. The terms and expressions employed herein have been used as terms of description and not of limitation; and thus, there is no intent of excluding equivalents, but on the contrary it is intended to cover any and all equivalents that may be employed without departing from the spirit and scope of this disclosure.

I claim:

1. A lighter-than-air craft comprising:
   an airship airframe having an outer surface;
   at least one source gas tank in the airframe for holding compressed or liquid hydrogen or helium;
   at least one compartment in the airframe holding an inflatable bladder, wherein said inflatable bladder can be inflated with hydrogen or helium gas from the at least one source gas tank;
   a vent in the compartment allowing air to exit said compartment when the bladder is inflated and allowing air to enter the compartment when the bladder is deflated;
   wherein, inflating and deflating the bladder partially controls buoyancy of said lighter-than-air ship;
   a plurality of solar cells covering said outer surface of the airship;
   the solar cells producing electricity to power electric motors configured to provide propulsion to said airship;
   a gas recovery system constructed to take gas from the bladder as the bladder is deflated and store the gas in a low pressure recovered gas storage tank;
   a pump powered by electricity from the solar cells that recompresses gas from the low pressure recovered gas storage tank and pumps it into the at least one source gas tank.

2. The lighter-than-air craft of claim 1 wherein said electricity is also used to produce hydrogen from water, and wherein said hydrogen from water is stored for later use either commercially or as a lift gas for the craft.

3. The lighter-than-air craft of claim 1 wherein power from said solar cells is used to charge a battery.

4. The lighter-than-air craft of claim 1 wherein said outer surface is a carbon fiber composite material, film laminate or fluorocarbon polymer.

5. An airship having an airframe comprising:
   a source tank in the airframe for holding compressed or liquid hydrogen or helium;
   at least one compartment in the airframe holding an inflatable bladder, wherein said inflatable bladder can be inflated with hydrogen or helium lift gas from the source tank;
   a vent in the compartment allowing air to exit said compartment when the bladder is inflated and allowing air to enter the compartment when the bladder is deflated;
   wherein, inflating and deflating the bladder partially controls buoyancy of said lighter-than-air ship;
   an outer covering including a plurality of attached solar cells, the solar cells producing electrical energy that drive electric motors that provide propulsion to the airship;
   a gas recovery system constructed to take gas from said bladder as the bladder is deflated and store the gas in a low pressure recovered gas storage tank;
   a pump configured to recompress gas from the low pressure recovered gas storage tank and pump it into the source tank.

6. The airship of claim 5 wherein said electrical energy is used to drive a power conversion unit that converts a first DC voltage from the solar cells to a second DC voltage, said second DC voltage being used to charge a battery.

7. The airship of claim 6 further comprising a second power conversion unit supplying current at the second DC voltage to a hydrogen generation unit that converts water to hydrogen.

8. The airship of claim 6 further comprising:
   the battery or the power conversion unit also supplying current to a hydrogen conversion cell that is constructed to convert water from a reservoir into hydrogen gas;

a pump/compressor connected between the hydrogen conversion unit and a hydrogen storage tank, the pump/compressor taking hydrogen gas from the hydrogen conversion unit and storing it in the source hydrogen storage tank.

9. The airship of claim 8 wherein the hydrogen conversion cell has an anode electrode and a cathode electrode, said electrodes electrically connected to the battery.

10. The airship of claim 8 wherein the hydrogen conversion cell has an anode electrode and a cathode electrode, said electrodes electrically connected to the power conversion unit.

11. The airship of claim 5 wherein the electric motors can tilt or pan in order to select thrust direction.

12. The airship of claim 5 wherein said plurality of attached solar cells produces up to 200 Watts per square meter in sunlight.

13. An airship having an airframe comprising:
a source tank in the airframe for holding compressed or liquid hydrogen;
at least one compartment in the airframe holding an inflatable bladder, wherein said inflatable bladder can be inflated with hydrogen lift gas from the source tank;
a vent in the compartment allowing air to exit said compartment when the bladder is inflated and allowing air to enter the compartment when the bladder is deflated;
wherein, inflating and deflating the bladder partially controls buoyancy of said lighter-than-air ship;
an outer covering including a plurality of attached solar cells, the solar cells producing electrical energy used to drive a power conversion unit that converts a first DC voltage from the solar cells to a second DC voltage, said second DC voltage being a regulated battery charge voltage used to charge a battery;
the power conversion unit supplying current from the battery to a DC motor controller that controls at least one DC propulsion motor;
the power conversion unit supplying current to a hydrogen conversion unit constructed to convert water to hydrogen;
the power conversion unit also supplying power to a pump that compresses hydrogen from the hydrogen conversion unit and pumps it into the source tank.

14. The airship of claim 13 wherein the hydrogen conversion cell has an anode electrode and a cathode electrode, said electrodes electrically connected to the battery.

15. The airship of claim 13 wherein the hydrogen conversion cell has an anode electrode and a cathode electrode, said electrodes electrically connected to the power conversion unit.

16. The airship of claim 13 wherein said plurality of attached solar cells produces up to 200 Watts per square meter in sunlight.

\* \* \* \* \*